United States Patent [19]
Johnson

[11] Patent Number: 5,672,398
[45] Date of Patent: Sep. 30, 1997

US005672398A

[54] FLEXIBLE TUBULAR STRUCTURES

[75] Inventor: Alexander Charles Edward Johnson, Tockwith, Great Britain

[73] Assignee: W. E. Rawson Limited, Wakefield, England

[21] Appl. No.: 258,435

[22] Filed: Jun. 10, 1994

[51] Int. Cl.$^6$ .............. F16L 11/04; F16L 11/14; F16L 11/08; F16L 11/02
[52] U.S. Cl. .......... 428/35.7; 138/137; 138/141; 138/145; 138/153; 138/174; 525/240; 428/36.9; 428/36.91; 428/500; 428/501; 428/515
[58] Field of Search ............... 428/35.7, 36.9, 428/36.91, 515, 500, 501; 138/137, 141, 145, 153, 174; 525/240

[56] References Cited

U.S. PATENT DOCUMENTS 4,397,337  8/1983  Porrmann et al. .................. 138/118.1

FOREIGN PATENT DOCUMENTS

| | | |
|---|---|---|
| 0209396 | 1/1987 | European Pat. Off. . |
| 0380270 | 8/1990 | European Pat. Off. . |
| 1569675 | 6/1980 | United Kingdom . |
| 1588399 | 4/1981 | United Kingdom . |
| 2197253 | 5/1988 | United Kingdom . |

*Primary Examiner*—W. Robinson H. Clark
*Attorney, Agent, or Firm*—Dority & Manning, P.A.

[57] ABSTRACT

A flexible tubular structure for use in the lining of passageways and methods relating thereto are described. The tubular structure is made of a laminate which comprises a film layer, made by melting and mixing ethylene-vinyl acetate copolymer (EVA) and polyethylene, and a felt layer. In a butt join region of the structure, a felt strip and polyethylene/EVA strip are heat welded for strength.

26 Claims, 1 Drawing Sheet

FLEXIBLE TUBULAR STRUCTURES

The present invention relates to a flexible tubular structure and particularly, although not exclusively, to a flexible tubular structure for use in the lining of passageways and methods relating thereto.

A known method of lining an underground passageway, such as a sewer, involves placing a flexible tube, usually of felt impregnated with resin, in contact with the inside wall of the sewer and allowing the resin to cure so that a self-supporting tubular structure is created inside the sewer. Methods such as this are effective in lining passageways such as sewers which have, over the years, eroded or fallen into disrepair.

Methods of lining passageways in this way can be roughly divided into two categories as follows:

The first category involves dragging or winching the resin-impregnated felt tube through the passageway and subsequently allowing the resin to harden so that a self-supporting tubular structure is formed. This method of introducing the flexible tube into the passageway can be difficult because of the relatively high friction between the flexible tube and the wall of the passageway, especially where the passageway to be lined includes bends and discontinuities.

The second category of methods are those which involve everting the tube into the passageway using water pressure. In these methods the resin-impregnated felt tube is secured at one end at the entrance to the passageway to be lined, and then forced along the passageway, at the same time turning it inside out, by means of water pressure.

With either the winching or everting methods it has been found advantageous to have a resin-impermeable covering, usually at least on the outside of the flexible tube, which covering serves the purpose of retaining the resin in the felt tube when the tube is being transported to the passageway and/or introduced into the passageway. In the case of the eversion methods the resin-impermeable covering serves a second function in that, as the tube turns inside out the covering appears out the inside of the tube and this prevents the water used to assist the eversion process from washing away the resin before it has cured.

A prior resin-impermeable covering comprises a film of polyurethane which is applied to the felt, prior to impregnation with resin, by either thermally welding a sheet of polyurethane to a sheet of felt or by calendering a molten mass of polyurethane onto a sheet of felt.

When the sheet of felt has been covered by the polyurethane film a tube is formed by joining the edges of the sheet. This can be achieved by chemically "welding" the overlapping edges of the polyurethane film together using a suitable solvent such as tetrahydrofuran, or by thermally welding them together.

When the tube is formed the felt (on the inside wall of the tube) is impregnated with a suitable resin. Two alternative kinds of resin are commonly used; namely a polyester resin or an epoxy resin. The epoxy resin is stronger but much more expensive and so the polyester resin tends to be more widely used. A disadvantage with the resin is that it can attack the polyurethane coating and weaken it or cause rippling. This necessitates a thicker film of polyurethane which further adds to the expense.

The resin must not be allowed to cure until the tube is in position in the underground passageway. Once the tube is in position the resin is either allowed to cure in its own time, common in the case of smaller diameter pipes, or forced to cure quickly by applying heat to the tube in the form of hot water, in the case of larger diameter pipes.

When the tube is introduced into the passageway using an eversion method the resin-impermeable covering appears on the inside of the tube to prevent the heated water in the tube from washing away the resin before it is cured. This means that the resin-impregnated felt is in contact with the inside wall of the passageway which gives rise to a disadvantage in that, where a lateral feed pipe joins the main passageway from eg. a house, the smell of the resin can diffuse along the lateral feed pipe into the house causing unpleasantness and in some cases illness to its occupants. Another problem with having the resin-impermeable coating on the inside of the tube is that any water seeping from the brickwork of the passageway can come into contact with the resin-impregnated felt and prevent the resin from curing. Because of this it has been found necessary to pull a resin-impermeable prelining tube through the passageway, prior to introduction of the main tube by eversion. Introducing the main tube into the passageway by a winching method does not incur these difficulties.

However, when using the winching method an inner impermeable tube or calibration hose is used to inflate the main tube. This can also be winched into place or alternatively be everted through the main tube. This inner tube or calibration hose can be made of reinforced PVC, in which case it can be removed after use. However, it has been found to be advantageous to use a thin layered felt tube with an impermeable coating attached. The felt tube upon eversion, becomes urged against the resin impregnated felt of the inner tube. The felt soaks up some excess resin from the main tube liner, thus becoming part of the completed structure.

Similarly, the resin impermeable pre-lining tube introduced initially as part of the eversion method, can be of felt with an impermeable layer attached so that this becomes part of the completed structure.

Another method of curing the resin involves irradiating the resin with ultra-violet light. In this method an ultra-violet lamp is winched through the everted tube in the passageway. Polyurethane cannot be used as the resin-impermeable covering when ultra-violet light is used to cure the resin, since polyurethane absorbs ultra-violet light. If the resin is to be cured using ultra-violet light in this way, the resin-impermeable covering may comprise alternate layers of nylon and Surlyn (Trade Mark). Unfortunately a resin-impermeable covering of this kind is expensive and is also difficult to weld together, to form the tube.

Accordingly, because of the expense of polyurethane, the problems caused by its chemical interaction with polyester resins and its unsuitability for methods involving curing the resin by irradiation with ultra-violet light, it has long been felt necessary to find a suitable alternative to polyurethane for the resin-impermeable covering.

Polyethylene, being relatively inexpensive compared with polyurethane, has been proposed as a resin-impermeable covering for the felt. Unfortunately, polyethylene has a number of disadvantages for this application. Firstly it is difficult to make a polyethylene layer stick to a layer of felt. Secondly, because polyethylene is chemically inert it cannot easily be welded to itself in order to form the tube from the flat laminated sheet. In addition to this, when polyethylene is thermally welded to itself the weld is very weak. Attempts have been made to glue overlapping edges of polyethylene sheets together to form the tube but, due to the polyethylene being chemically inert, the glue was unable to securely bond to the polyethylene.

According to the invention, there is provided a flexible tubular structure comprising a first layer and a second layer, the second layer comprising a material formed by mixing a first component comprising polyethylene and/or polypropylene with a second component comprising an optionally substituted alkene-vinyl alkanoate copolymer.

A main tube preferably has said flexible tubular structure. Alternatively or additionally, an inner tube or calibration hose may have said flexible tubular structure.

The first layer preferably comprises a fibrous layer. The first layer is preferably a liquid, for example, a resin, absorbent layer. Said first layer may comprise a felt which may comprise, for example, glass, polyester, acrylic, polypropylene or polyamide fibre. The first layer may be impregnated with uncured synthetic resin.

Preferably, the polyethylene and polypropylene described as being used herein are low density polyethylene and low density polypropylene respectively.

Preferably, the first component of said second layer comprises only one of either polyethylene or polypropylene. More preferably, the first component comprises polyethylene.

Where the alkene-vinyl alkanoate copolymer is substituted, it may be substituted by one or more halogen, suitably chlorine or bromine, atoms. Preferably, the alkene-vinyl alkanoate copolymer is unsubstituted.

The alkene and alkanoate moieties of the alkene-vinyl alkanoate copolymer preferably independently comprise from two to six, more preferably, from two to four, carbon atoms. The alkene moiety preferably represents ethylene. The alkanoate moiety preferably represents acetate. Thus, preferably, the alkene-vinyl alkanoate copolymer represents ethylene-vinyl acetate copolymer.

Thus, preferably, the material of said second layer is formed by mixing polyethylene or polypropylene with ethyl-vinyl acetate copolymer.

In the most preferred embodiment, the material of the second layer is formed by mixing polyethylene and ethylene-vinyl acetate copolymer.

The material of said second layer may be formed by mixing together 40% to 98% of said first component and 2% to 60% of said second component. Preferably, the material of said second layer is formed by mixing together 65% to 85% of said first component and 15% to 35% of said second component. More preferably, the material of said second layer is formed by mixing together 70% to 80% of said first component and 20% to 30% of said second component.

The second layer may have a thickness in the range 0.1 mm to 1.5 mm. The first layer may have a thickness in the range 0.5 mm to 20 mm. The outside diameter of said flexible tubular structure may be in the range 60 mm to 2000 mm.

It is believed that the material formed by mixing together the first and second components described above results in the formation of a mixture in which the first and second components are not covalently bonded to one another.

The invention, therefore, extends to a flexible tubular structure comprising a first layer and a second layer, the second layer being formed from a mixture which comprises a first component which comprises polyethylene and/or polypropylene and a second component which comprises an optionally substituted alkene-vinyl alkanoate copolymer.

The mixture from which said second layer is formed is preferably substantially homogenous.

The first and second components of said mixture may be in accordance with any statement herein.

Preferably, the first and second layers contact one another.

The second layer is preferably relatively impermeable to uncured synthetic resin which may be impregnated in said first layer.

Preferably, in the flexible tubular structure, the first and second layers as described are in the form of concentric tubes which contact one another. Preferably, said first and second layers are the only layers in said flexible tubular structure in the form of tubes. Preferably, the first and second layers are fixed to one another.

The flexible tubular structure may be made by any suitable means, for example, as described in U.K. Patent Number 2031107.

Preferably, the flexible tubular structure is made by abutting longitudinally extending edges of a laminate comprising said first layer and said second layer (said second layer preferably being towards the outside) and butt joining said edges together. A first butt joint covering material is preferably provided to cover (and preferably also to reinforce), at least a part (preferably wholly) the butt joint between abutting longitudinally extending edges of said first layer. Said first butt joint covering material preferably comprises a felt material as described in any statement herein. A second butt joint covering material is preferably provided to cover (and preferably also to reinforce), at least in part (preferably wholly) the butt joint between abutting longitudinally extending edges of said second layer. Said second butt joint covering material preferably comprises any material described herein from which said second layer may be formed. More preferably, in a particular flexible tubular structure, the material of said second layer and said second butt joint covering material are the same. Preferably, the first and/or second butt join covering materials comprise strips which extend substantially along the whole length of the flexible tubular structure.

Using a second butt-joining material which is the same as that of the second layer as described herein may be particularly advantageous since it has been noted that, in this case, the two identical materials may be relatively easily heat welded to each other thereby making the formation oft he flexible tubular structure easier, in comparison to the case wherein said second layer comprises pure polyethylene or polypropylene film. Furthermore, a second layer formed as described above may be relatively easily fixed to a first layer of felt, in comparison to a case wherein pure polyethylene or polypropylene films are used.

A flexible tubular structure as described herein may have cost advantages compared to a case wherein, for example, a second layer which comprises a film of polyurethane is used.

Furthermore, since the second layer of the flexible tubular structure as described herein may be made using low density polyethylene or polypropylene, the weight of the second layer and, therefore, the weight of the flexible tubular structure itself may be reduced and thereby insertion of the structure into a passageway to be lined may be made easier. Additionally, a second layer formed as described herein may be less liable to penetration by resin impregnated in the first layer, in comparison to the case wherein a polyurethane second layer is used.

The invention extends to a flexible tubular structure as described in any statement herein wherein a second butt-joint covering material as described in any statement herein covers (and preferably also reinforces) a butt-joint between longitudinally extending edges of said second layer. A first butt-joint covering material as described in any statement herein may additionally cover (and preferably also reinforce) a butt-joint between longitudinally extending edges of said first layer.

The material of said second layer may be formed into a film by any suitable means. It is preferred that the first and second components oft he material of said second layer are melted and mixed so as to form a mixture which is preferably homogenous. The mixture may then be extruded to form a film for use in the formation of said flexible tubular structure.

The flexible tubular structure described herein is preferably for use in the lining of a passageway which is preferably underground.

The invention extends to a laminate for a flexible tubular structure, the laminate comprising a first fibrous layer and a second layer comprising a material formed by mixing a first component comprising polyethylene and/or polypropylene with a second component comprising an optionally substituted alkene-vinyl alkanoate copolymer.

The invention extends to a method of lining a surface at least partially defining a passageway, the method including the step of urging a flexible tubular structure comprising a first layer and a second layer each being as described in any statement herein, wherein said first layer is impregnated with an uncured synthetic resin, into a passageway to be lined and curing said resin.

The flexible tubular structure may be in accordance with any statement herein.

The invention further extends to a passageway when lined with a flexible tubular structure as described in any statement herein.

BRIEF DESCRIPTION OF THE DRAWINGS

A specific embodiment of the present invention will now be described, by way of example, with reference to the accompanying diagrammatic drawings.

DETAILED DESCRIPTION

Figure 1:
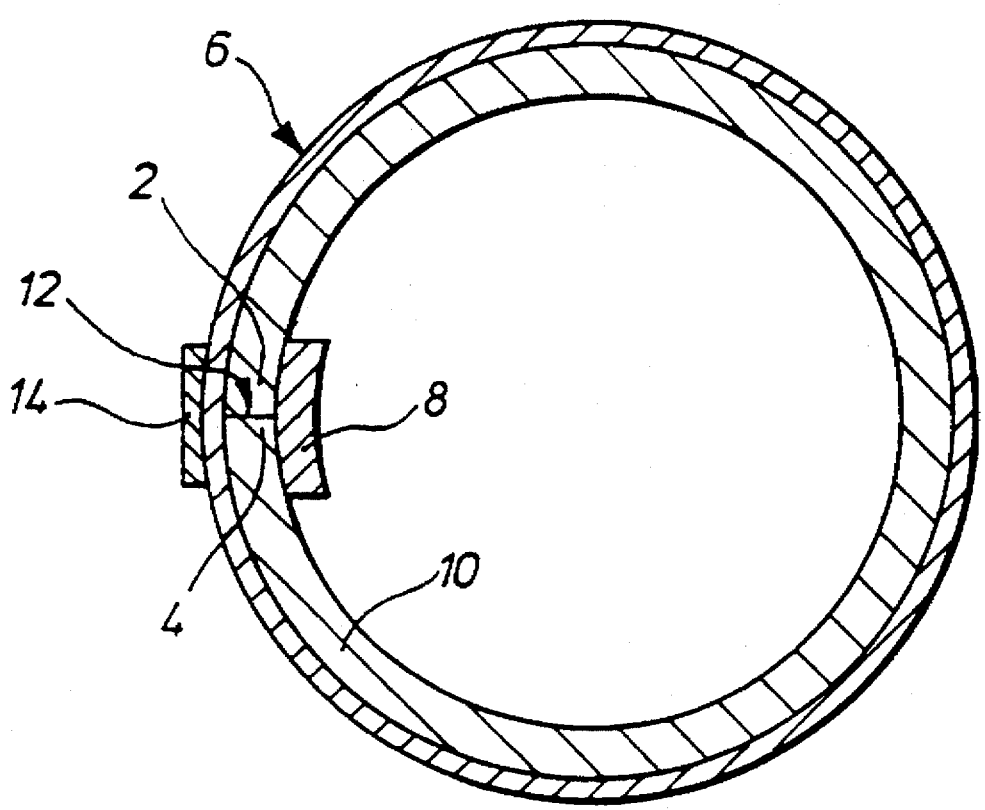
FIG. 1 is a cross-sectional view of a flexible tubular structure.
Figure 2:
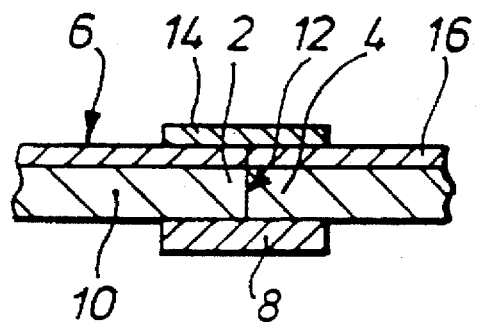
FIG. 2 is a detailed view of a butt joint region of the flexible tubular structure.

Ethylene-vinyl acetate copolymer (EVA), in chip or powder form, is blended with polyethylene chips and fed into an extruder where both are melted and mixed so as to form a homogenous mixture. The mixture is then extruded so as to form a film of material.

As an alternative, polyethylene/EVA pre-mixed chips may be fed into an extruder and a film of material subsequently formed.

In both of the aforementioned cases, 75% polyethylene and 25% EVA is used to make the film.

The polyethylene/EVA film is then attached to a felt layer using the method described in U.K. Patent Number 1 569 675. The felt/film laminate may then be formed into a flexible tubular structure in the manner described in U.K. Patent Number 2 031 107. Alternatively, the flexible tubular structure may be formed as described below.

Opposite longitudinally extending edges of 2, 4 of the felt/film laminate 6 are abutted and a longitudinally extending reinforcing felt strip 8 is heat welded to felt layer 10 of the laminate on one side of a butt-joint region 12. A strip of polyethylene/EVA 14 is then heat welded to the polyethylene/EVA layer 16 on the other side of the butt-joint region 12.

The polyethylene/EVA film of the layer 16 and the strip 14 can be relatively easily welded to each other, in comparison to the case wherein a pure polyethylene layer and strip are used. It is, in fact, very difficult to weld pure polyethylene film layers together. The ease by which film layers may be welded together is important as is the integrity of such a weld since resin impregnated in the felt layer 10 must not be allowed to seep out thereof via the butt-joint region 12.

Furthermore, the flexible tubular structure of which the film according to the present invention forms a part, includes a tube made of needled felt to which the film is attached as described above. It has been found that the polyethylene/EVA film can be more easily attached to felt by means of heat, compared to the ease of fixing pure polyethylene film to such felt.

Additionally, it has been found that polyethylene/EVA film is more flexible than a pure polyethylene film of the same thickness. Thus, a relatively thick polyethylene/EVA film may be used and a flexible tube comprising such a film may still be relatively easily everted, whereas if the same thickness of pure polyethylene film is used in a flexible tube, it may be relatively difficult or impossible to evert the tube.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. An underground passageway comprising a flexible tubular structure, the structure comprising a first layer and a second layer in contact therewith, the first layer being a fibrous layer capable of being impregnated with a resin and the second layer comprising a material formed by mixing a first component comprising polyethylene and/or polypropylene with a second component comprising an optionally substituted alkene-vinyl alkanoate copolymer.

2. An underground passageway according to claim 1, wherein the first layer is impregnated with uncured synthetic resin.

3. An underground passageway according to claim 1, wherein the polyethylene and polypropylene are low density polyethylene and low density polypropylene respectively.

4. An underground passageway according to claim 1, wherein the first component of said second layer comprises only one of either polyethylene or polypropylene.

5. An underground passageway according to claim 1, wherein the first component comprises polyethylene.

6. An underground passageway according to claim 1, wherein the alkene-vinyl alkanoate copolymer is unsubstituted.

7. An underground passageway according to claim 1, wherein the alkene and alkanoate moieties of the alkenevinyl alkanoate copolymer independently comprise from two to six carbon atoms.

8. An underground passageway according to claim 7, wherein the alkene moiety represents ethylene.

9. An underground passageway according to claim 7, wherein the alkanoate moiety represents acetate.

10. An underground passageway according to claim 1, wherein the alkene-vinyl alkanoate copolymer represents ethylene-vinyl acetate copolymer.

11. An underground passageway according to claim 1, wherein the material of said second layer is formed by mixing together 40% to 98% of said first component and 2% to 60% of said second component.

12. An underground passageway according to claim 1, wherein the first and second layers are in the form of concentric tubes which contact one another.

13. A method of lining a surface at least partially defining a passageway, the method including the step of urging a flexible tubular structure comprising a first layer and a second layer as claimed in claim 1, wherein said first layer is impregnated with an uncured synthetic resin, into a passageway to be lined and curing said resin.

14. A laminate for a flexible tubular structure as described in claim 1, the laminate comprising a first layer and a second layer in contact therewith, the first layer being a fibrous layer arranged to be impregnated with a resin and the second layer comprising a material formed by mixing a first component comprising polyethylene and/or polypropylene with a second component comprising an optionally substituted alkenevinyl copolymer.

15. An underground passageway comprising a flexible tubular structure comprising a first layer and a second layer in contact therewith, the first layer capable of being impregnated with a resin and the second layer being formed from a mixture which comprises a first component which comprises polyethylene and/or polypropylene and a second component which comprises an alkene-vinyl alkanoate copolymer.

16. An underground passageway according to claim 15, wherein the first and second layers are in the form of concentric tubes which contact one another.

17. A laminate for a flexible tubular structure as described in claim 15, the laminate comprising a first layer and a second layer in contact therewith, the first layer being a fibrous layer capable of being impregnated with a resin and the second layer comprising a material formed by mixing a first component comprising polyethylene and/or polypropylene with a second component comprising an optionally substituted alkene-vinyl alkanoate copolymer.

18. An underground passageway according to claim 1, wherein said first layer is made from a material selected from the group consisting of glass fibers, polyester fibers, acrylic fibers, polypropylene fibers, polyamide fibers, and mixtures thereof.

19. An underground passageway according to claim 15, wherein said first layer is made from a material selected from the group consisting of glass fibers, polyester fibers, acrylic fibers, polypropylene fibers, polyamide fibers, and mixtures thereof.

20. An underground passageway according to claim 2, wherein said uncured synthetic resin is a material selected from the group consisting of an epoxy resin and a polyester resin.

21. A structure according to claim 15, wherein the first layer is impregnated with uncured synthetic resin, said resin being a material selected from the group consisting of an epoxy resin and a polyester resin.

22. A method of lining a surface at least partially defining a passageway as defined in claim 13 wherein said flexible tubular structure is everted into said passageway to be lined.

23. A sewer passageway comprising a flexible tubular structure, the structure comprising a first layer and a second layer in contact therewith, the first layer being a fibrous layer capable of being impregnated with a resin and a second layer comprising a material formed by mixing a first component comprising polyethylene and/or polypropylene with a second component comprising an optionally substituted alkene-vinyl alkanoate copolymer.

24. A sewer passageway as defined in claim 23, wherein the first layer is impregnated with an uncured synthetic resin.

25. A sewer passageway as defined in claim 23, wherein the first component comprises polyethylene and said alkene-vinyl alkanoate copolymer comprises ethylene-vinyl acetate copolymer.

26. A sewer passageway as defined in claim 23, wherein the material of said second layer is formed by mixing together 40% to 98% of said first component and 2% to 60% of said second component.

\* \* \* \* \*